United States Patent [19]

Müller

[11] Patent Number: 4,511,471
[45] Date of Patent: Apr. 16, 1985

[54] FILTER APPARATUS FOR CONTINUOUSLY THICKENING SUSPENSIONS

[75] Inventor: Hans Müller, Erlenbach, Switzerland

[73] Assignee: DrM, Dr. Müller AG, Männedorf, Switzerland

[21] Appl. No.: 500,313

[22] Filed: Jun. 2, 1983

[30] Foreign Application Priority Data

Jun. 3, 1982 [CH] Switzerland .......................... 3401/82

[51] Int. Cl.³ ........................ B01D 29/32; B01D 35/12
[52] U.S. Cl. ............................. 210/323.2; 210/333.01; 210/333.1
[58] Field of Search ...................... 210/306, 320, 323.2, 210/331, 333.1, 347, 411, 333.01

[56] References Cited

U.S. PATENT DOCUMENTS

| | | | |
|---|---|---|---|
| 4,163,724 | 8/1979 | Müller et al. | 210/323.2 |
| 4,213,861 | 7/1980 | Müller et al. | 210/333.01 |
| 4,277,349 | 7/1981 | Schwinghammer | 210/323.2 |
| 4,439,327 | 3/1984 | Müller | 210/323.2 |

FOREIGN PATENT DOCUMENTS 261635  5/1968  Fed. Rep. of Germany ... 210/333.1

Primary Examiner—Benoit Castel
Attorney, Agent, or Firm—Michael J. Striker

[57] ABSTRACT

A filter apparatus for continuously thickening a suspension is proposed. The filter apparatus consists of a housing which accommodates a plurality of filter elements depending on individual collecting pipes. The collecting pipes are located parallel to each other and are separated by intermediate walls which extend beyond the collecting pipes and the filter elements in axial direction.

3 Claims, 2 Drawing Figures

FILTER APPARATUS FOR CONTINUOUSLY THICKENING SUSPENSIONS

BACKGROUND OF THE INVENTION

The invention relates to a filter apparatus for continuously thickening suspensions in a filter thickener provided with candle-shaped filter elements.

The German Offenlegungsschrift DE-OS No. 27 41 639 discloses a filter thickener including a filter container in which a plurality of collecting pipes are arranged. A plurality of filter elements depends in series from the collecting pipes which are located adjacent to each other on support members and can be individually removed from the filter container.

From the Austrian patent AT-PS No. 211 329, there is known a plant for backwashing of filter candles which are arranged in series. The line conduits to which the filter elements are mounted, are guided horizontally on both sides through the container wall.

The bilateral guidance of the line conduits is, however, rather cumbersome and consequently expensive. In addition to the extensive number of container boreholes, each of the line conduits is provided with two shutoff devices, thereby rendering necessary a plurality of valves and armatures.

Moreover, it is to be noted that all known apparatuses of this kind for thickening suspensions by means of a filter thickener inherit the disadvantage that after termination of a filtration cycle, filter aids have to be added in order to improve the service life of the filter apparatus.

SUMMARY OF THE INVENTION

It is therefore an object of the present invention to avoid the disadvantages of the prior art.

More particularly, it is an object of the invention to provide a filter apparatus for continuously thickening suspensions without or at best with a minimum addition of filter aid.

A concomitant object of the present invention is to achieve a filter apparatus which is simple in construction, reliable in operation and inexpensive to manufacture nevertheless.

In keeping with these objects and with others which will become apparent hereinafter, one feature of the present invention resides briefly stated in a filter apparatus which comprises a housing defining a chamber therein and having an axis, a plurality of individual collecting pipes arranged in the chamber and fixed to the housing, a plurality of filter elements mounted to the collecting pipes for providing filtration with formation of a filtrate, means for allowing the filtrate to be discharged and a gas to be injected in counterdirection to the flow of the filtration through respective ones of the filter elements when filtration is stopped for cleaning the respective filter elements, and means for separating the individual collecting pipes from each other so that the gas is prevented from acting on and damaging adjacent filter elements still filtrating.

In a preferred embodiment, the separating means are a plurality of intermediate walls or partitions which extend in axial direction beyond the filter elements. It is especially preferred to provide the intermediate walls of sheet metal.

According to a further feature of the invention, the allowing means include a plurality of three-way valves, wherein each of the valves is in communication with the respective collecting pipes to either the outlet through which the filtrate is to be discharged or to a pressure gas conduit through which gas is introduced to the filter elements in counterdirection of the filtrate flow.

Through the provision of such a filter apparatus, a continuous thickening of suspensions is performed without necessitating the removal of individual collecting pipes. Moreover, the filter elements which do not perform any filtration are cleaned by gas in counterdirection of the flow of filtration so that the filter cake can be removed while the filtration still occurring at adjacent filtrating elements mounted to respective collecting pipes is not impaired through the gas by providing the respective separating walls so that the respective filter cakes cannot be removed and damage of adjacent filter elements is avoided.

The novel features which are considered characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
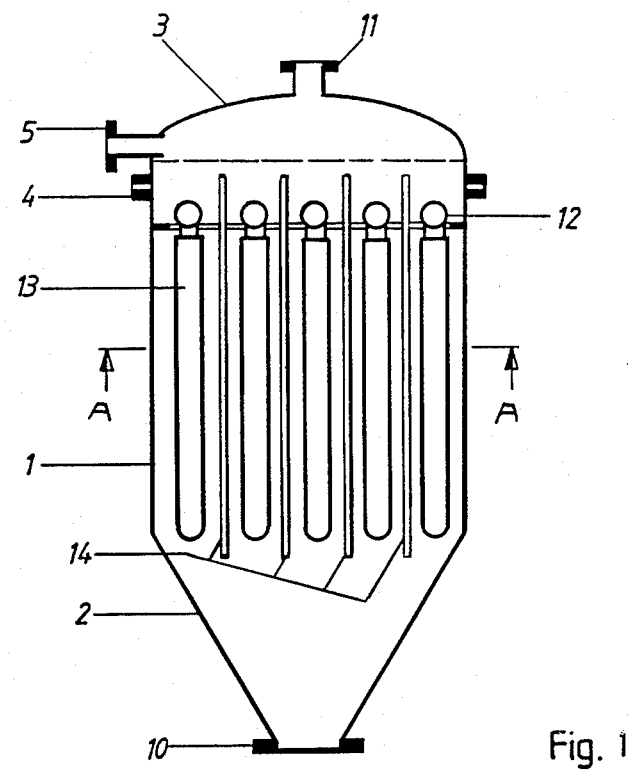
FIG. 1 is a longitudinal section of a filter thickener in accordance with the present invention.

Referring firstly to FIG. 1, there is shown a filter apparatus consisting of a housing having a cylindrical portion and a conically shaped bottom portion 2 as well as a cover 3. The cover 3 is connected to the cylindrical portion 1 by means of a flange 4. In the upper portion of the housing, an inlet 5 for the liquid to be filtrated and a plurality of outlet pipes 8, 8', 8'', 8''', 8'''' for the filtrate are provided. As can be further seen from FIG. 1, an outlet connection 10 is provided at the conical bottom 2 for discharging the slurry while a connecting pipe 11 is provided at the cover 3 for providing a ventilation or pressure control, respectively. The housing which defines a chamber therein accommodates a plurality of individual collecting pipes 12 which as illustrated are arranged parallel to each other. Each of the individual collecting pipes 12 carries a plurality of filter elements 13 which depend therefrom. In the spaces between the collecting pipes 12 and the filter elements 13, intermediate walls or partitions 14 are inserted which in axial direction of the housing extend beyond the collecting pipes 12 and the filter elements 13. Consequently, the intermediate walls 14 extend into the space above the collecting pipes 12 and into the conically shaped bottom portion 2 of the filter apparatus.

Figure 2:
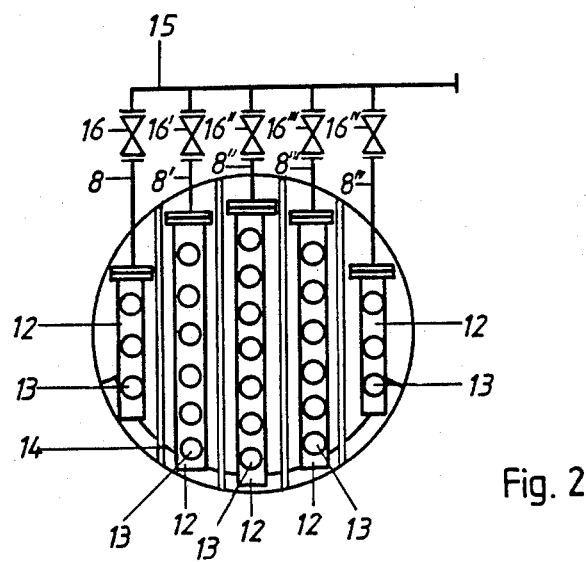
FIG. 2 is a sectional view along line A—A according to FIG. 1.

As can be seen from FIG. 2, each of the outlet pipes 8, 8', 8'', 8''', 8'''' is connected to a main conduit 15 for discharging the filtrate. Between each of the outlet pipes 8, 8', 8'', 8''', 8'''' and the main conduit 15, a three-way valve 16, 16', 16'', 16''', 16'''' is interposed. The three-way valves are connected to a not shown pressure gas conduit, the purpose of which will be described hereinbelow.

After having described the individual parts of the filter apparatus, the mode of operation is illustrated in detail:

For providing thickening of a suspension, the turbid liquid is introduced through inlet 5. The dotted line as shown in FIG. 1 indicates the level of the liquid. During filtration, the solid substances are deposited on the cloth of the filter elements thereby forming a filter cake. The suspension free from solid substances is discharged via the collecting pipe 12 and the respective outlet pipes 8, 8′, 8″, 8‴, 8⁗ through the main conduit 15. The upper portion of the housing contains an air cushion of approximately one-sixth to one-fourth of the entire volume of the filter housing. The air cushion serves for regulating the liquid level.

In case it is desired to clean the filter elements 13 of one of the individual collecting pipes 12, the filtration is stopped by switching one of the respective three-way valves 16, 16′, 16″, 16‴, 16⁗ which is then connecting the respective outlet pipe with a not shown compressed gas source. Consequently, compressed gas is introduced through the filter elements in counterdirection of the filtration thereby removing the filter cake from the filter elements of respective collecting pipes by generated back impulse. The filter cake then drops to the conically shaped bottom 2 of the housing and is eventually removed as slurry from the housing through outlet connection 10. Through the provision of the intermediate wall 14 between the collecting pipes 12 and respective filter elements 13, the gas which upon removal of the filter cake penetrates through the filter cake is prevented from acting on adjacent filter elements. Consequently, the intermediate walls 14 prevent a removal of filter cakes of adjacent filter elements and moreover, prevents a damage of those adjacent filter elements still filtrating.

The intermediate walls 14 are made of sheet metal or other material and, as already mentioned, extend beyond the filter elements and the collecting pipes.

It will be understood that each of the elements described above, or two or more together, may also find a useful application in other types of filter apparatuses differing from the types described above.

While the invention has been illustrated and described as embodied in a filter apparatus, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential features of the generic or specific aspects of this invention.

What is claimed as new and desired to be protected by Letters Patent is set forth in the appended claims:

1. A filter apparatus for continuously thickening suspensions, comprising: a housing defining a chamber therein and having an axis, a filtrate chamber portion, and a slurry chamber portion; a plurality of individual collecting pipes arranged in the chamber of the housing; a plurality of filter elements mounted on the collecting pipes for providing filtration with formation of a filtrate, each of the filler elements having an upper edge and a lower edge; outlet means for allowing the filtrate to be discharged and a pressure gas conduct for introducing gas through respective ones of the filter elements in counterdirection to the filtration when filtration is to be stopped for cleaning the respective filter elements, said allowing means including valves each associated with a respective collecting pipe to the outlet means and to the pressure gas conduit; and means for separating the individual collecting pipes from each other so that the gas is prevented from acting on and damaging adjacent filter elements still filtrating, said separating means including a plurality of stationary intermediate walls each arranged between two individual collecting pipes and extending equally deeply into said filtrate chamber portion and into said slurry chamber portion of said chamber beyond the upper edge and lower edge of the filter elements.

2. A filter apparatus as defined in claim 1, wherein each intermediate wall is of sheet metal.

3. A filter apparatus as defined in claim 1, wherein the valves are three-way valves.

* * * * *